United States Patent
Mankowski et al.

(10) Patent No.: US 9,075,464 B2
(45) Date of Patent: Jul. 7, 2015

(54) STYLUS BASED OBJECT MODIFICATION ON A TOUCH-SENSITIVE DISPLAY

(71) Applicant: Research In Motion Limited, Waterloo (CA)

(72) Inventors: Peter Mankowski, Waterloo (CA); Cornel Mercea, Waterloo (CA); Krzysztof Zawada, East Hazel Crest, IL (US)

(73) Assignee: BlackBerry Limited, Waterloo, Ontario (CA)

( * ) Notice: Subject to any disclaimer, the term of this patent is extended or adjusted under 35 U.S.C. 154(b) by 204 days.

(21) Appl. No.: 13/754,217

(22) Filed: Jan. 30, 2013

(65) Prior Publication Data

US 2014/0210730 A1    Jul. 31, 2014

(51) Int. Cl.
*G06F 3/041*    (2006.01)

(52) U.S. Cl.
CPC ..................................... *G06F 3/041* (2013.01)

(58) Field of Classification Search
CPC .... G06F 3/041; G06F 3/0481; G06F 3/04845
USPC ................................................. 345/173–179
See application file for complete search history.

(56) References Cited

U.S. PATENT DOCUMENTS

| | | | |
|---|---|---|---|
| 4,577,057 A | 3/1986 | Blesser | |
| 5,198,623 A | 3/1993 | Landmeier | |
| 5,239,489 A | 8/1993 | Russell | |
| 5,248,855 A | 9/1993 | Cambridge | |
| 5,883,338 A | 3/1999 | Trunck et al. | |
| 6,737,591 B1 | 5/2004 | Lapstun et al. | |
| 7,190,375 B2 | 3/2007 | Dresevic et al. | |
| 7,283,670 B2 | 10/2007 | Wakeam et al. | |
| 7,773,076 B2 | 8/2010 | Pittel et al. | |
| 2004/0028274 A1* | 2/2004 | Kawakami et al. | 382/187 |
| 2004/0246240 A1 | 12/2004 | Kolmykov-Zotov et al. | |
| 2005/0024346 A1* | 2/2005 | Dupraz et al. | 345/179 |
| 2008/0225007 A1* | 9/2008 | Nakadaira et al. | 345/173 |
| 2009/0167702 A1 | 7/2009 | Nurmi | |
| 2010/0051356 A1 | 3/2010 | Stern et al. | |
| 2010/0181121 A1* | 7/2010 | Tremblay | 178/19.01 |

(Continued)

FOREIGN PATENT DOCUMENTS

EP    1821182    8/2007
WO   2011121375    10/2011

OTHER PUBLICATIONS

EESR dated Jun. 6, 2013 for EP Application No. 13153346.

(Continued)

*Primary Examiner* — Aneeta Yodichkas
*Assistant Examiner* — Brent D Castiaux
(74) *Attorney, Agent, or Firm* — Jon Gibbons; Fleit Gibbons Gutman Bongini & Bianco P.L.

(57) ABSTRACT

A stylus is used to modify the appearance of objects rendered on a touch-sensitive display. One of a plurality of objects on the display is selected by making contacting the object with the stylus. The stylus tilt and stylus contact pressure are determined. The appearance of the selected object is modified in response to the stylus tilt of the stylus and the stylus contact pressure.

20 Claims, 6 Drawing Sheets

(56) References Cited

U.S. PATENT DOCUMENTS

| | | |
|---|---|---|
| 2010/0271307 A1* | 10/2010 | Yen et al. ............ 345/168 |
| 2011/0185300 A1 | 7/2011 | Hinckley et al. |
| 2011/0265046 A1 | 10/2011 | Hinckley |
| 2012/0206330 A1 | 8/2012 | Cao et al. |
| 2012/0287053 A1 | 11/2012 | Bos et al. |
| 2012/0306903 A1 | 12/2012 | Griffin |

OTHER PUBLICATIONS

Shapir, O., et al., "Conceptual Design: An Operational Prescription for a Computer Support System." Faculty of Architecture and Town Planning. Israel Institute of Technology. Copyright 2007, Computer Graphics, Imaging and Visualisation. Aug. 2007. Ip031129072, ISBN: 978-0-7695-2928-8.

\* cited by examiner

STYLUS BASED OBJECT MODIFICATION ON A TOUCH-SENSITIVE DISPLAY

FIELD OF THE DISCLOSURE

The present disclosure generally relates to electronic devices with touch-sensitive displays and the control of such electronic devices using a stylus.

BACKGROUND

Electronic devices, including portable electronic devices, have gained widespread use and may provide a variety of functions including, for example, telephonic, electronic messaging and other personal information manager (PIM) application functions. Portable electronic devices include, for example, several types of mobile stations such as simple cellular telephones, smart telephones, wireless personal digital assistants (PDAs), and laptop computers with wireless 802.11 or Bluetooth capabilities.

A touch-sensitive display, also known as a touchscreen display, is particularly useful on handheld devices including PDAs, smart phones and tablets, for example, which are small and have limited space for user input and output. The information rendered on the touch-sensitive displays may be rendered and modified with a stylus depending on the functions and operations being performed.

Improvements in electronic devices with touch-sensitive displays are desirable.

BRIEF DESCRIPTION OF THE DRAWINGS

The accompanying figures in which like reference numerals refer to identical or functionally similar elements throughout the separate views, and which together with the detailed description below are incorporated in and form part of the specification, serve to further illustrate various embodiments and to explain various principles and advantages all in accordance with the present disclosure, in which.

DETAILED DESCRIPTION

Figure 1:
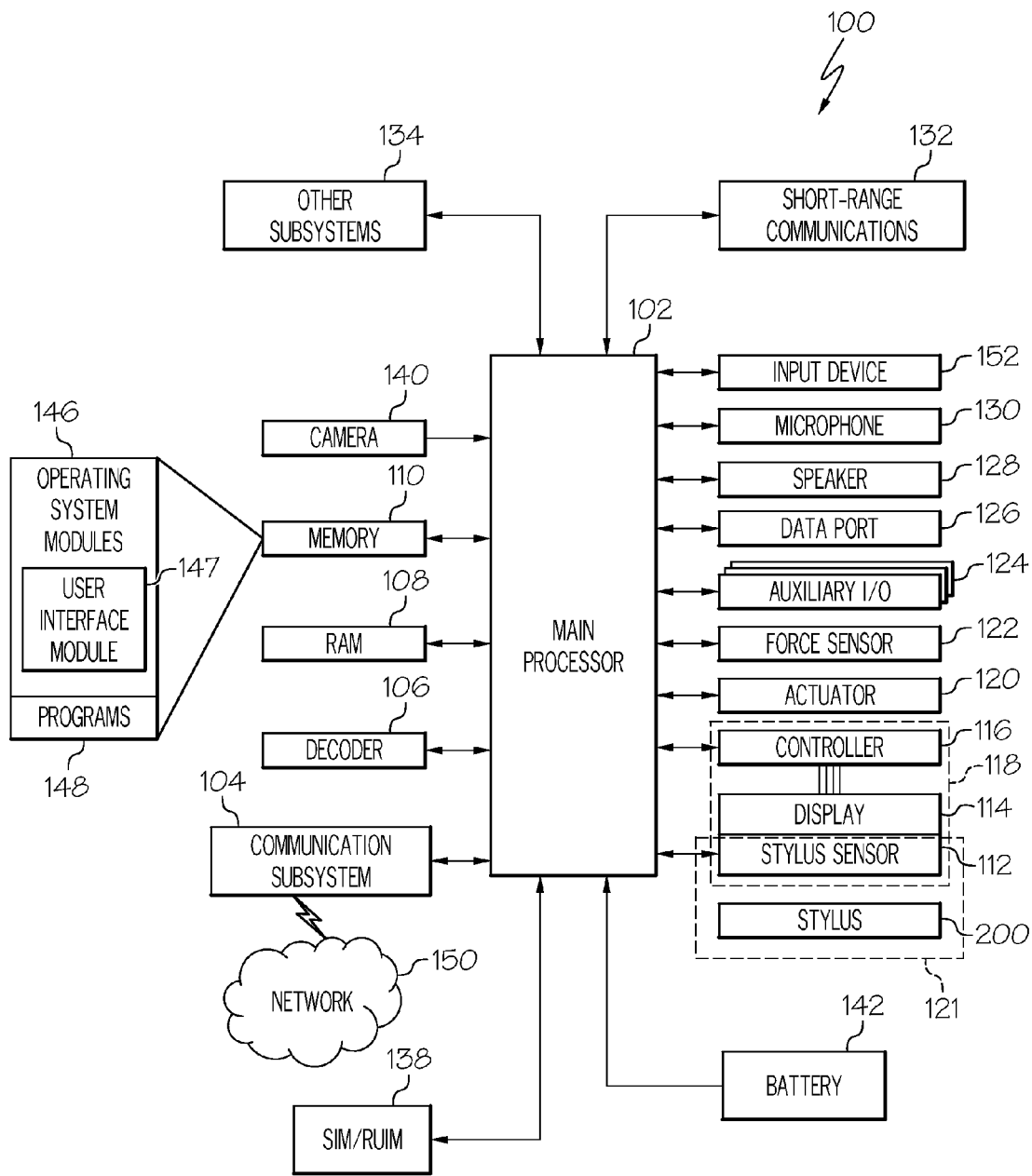
FIG. 1 shows a block diagrams of an apparatus for modifying an appearance of an object rendered on the apparatus.

While detailed embodiments are disclosed herein, it is to be understood that the disclosed embodiments are merely examples and that the devices, systems and methods described herein can be embodied in various forms. Therefore, specific structural and functional details disclosed herein are not to be interpreted as limiting, but merely as a basis for the claims and as a representative basis for teaching one of ordinary skill in the art to variously employ the disclosed subject matter in virtually any appropriately detailed structure and function. Further, the terms and phrases used herein are not intended to be limiting, but rather, to provide an understandable description. Additionally, unless otherwise specifically expressed or clearly understood from the context of use, a term as used herein describes the singular or the plural of that term.

In one aspect, there is provided a method for modifying an object rendered on a touch-sensitive display in response to a stylus input comprising: determining a contact location of the stylus upon the touch-sensitive display; determining a location of a selected object of a plurality of objects rendered on the touch-sensitive display to correspond to the contact location; determining a stylus tilt relative to the touch-sensitive display; and modifying an at least one appearance characteristic of the selected object in response to the stylus tilt.

In another aspect, there is provided a method for modifying an object rendered on a touch-sensitive display in response to a stylus input comprising: determining a contact location of the stylus upon the touch-sensitive display; determining a location of a selected object of a plurality of objects rendered on the touch-sensitive display to correspond to the contact location; determining a stylus contact pressure of the stylus making contact with the touch-sensitive display; and modifying an at least one appearance characteristic of the selected object in response to the stylus contact pressure.

In another aspect, there is provided an apparatus for modifying an appearance of an object rendered on the apparatus comprising: a display for rendering a plurality of objects; a stylus sensor for determining a contact location of a stylus upon the display; a user interface module for rendering each of the plurality of objects in a corresponding plurality of locations on the display and for determining a location of a selected object of the plurality of objects, the location of the selected object corresponding to the contact location; the stylus sensor further for determining a stylus tilt of the stylus relative to the display; and the user interface module further for modifying an at least one appearance characteristic of the selected object in response to the stylus tilt.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

The disclosure generally relates to an electronic device, which is a portable electronic device in the embodiments described herein. Examples of a portable electronic device includes a Personal Information Manager (PIM), Personal Digital Assistant (PDA), a pager, a mobile phone, a cellular phone, a smart-phone, a super-phone, a tablet computer, a laptop, and a Personal Computer (PC). The portable electronic device may also be a portable electronic device without wireless communication capabilities, such as a handheld electronic game device, digital photograph album, digital camera, or other device.

FIG. 1 shows a block diagram an apparatus for modifying an appearance of an object rendered on the apparatus. The portable electronic device 100 includes multiple components, such as a processor 102 that controls the overall operation of the portable electronic device 100. Communication functions, including data and voice communications, are performed through a communication subsystem 104. Data received by the portable electronic device 100 is decompressed and decrypted by a decoder 106. The communication subsystem 104 receives messages from and sends messages to a wireless network 150. The wireless network 150 may be any type of wireless network, including, but not limited to, data wireless networks, voice wireless networks, and networks that support both voice and data communications. Battery 142, includes one or more rechargeable batteries or a port to an external power supply for powering the portable electronic device 100.

The processor 102 interacts with other components, such as Random Access Memory (RAM) 108 and memory 110. The processor 102 also interacts a display 114, a stylus sensor 112 including a touch-sensitive overlay operably connected to an controller 116 that together comprise a touch-sensitive display 118. The processor 102 also interacts an auxiliary input/output (I/O) subsystem 124, a data port 126, a speaker 128, a microphone 130, short-range communications 132, and device subsystem 134 which may include other device subsystems. Stylus sensor 112 and stylus 200 form a stylus sensor system 121 which is also able to interface with the touch-sensitive overlay of the stylus sensor 112. The processor 102 may optionally interact with one or more actuators 120 to provide tactile feedback and one or more force sensors 122 to detect a force imparted on the touch-sensitive display 118. Interaction with a graphical user interface is performed through the stylus sensor 112. The processor 102 interacts with the stylus sensor 112 via the controller 116. Information, such as objects including text, characters, symbols, images, icons, and other items that may be displayed or rendered on a portable electronic device, is rendered on the touch-sensitive display 118 via the processor 102. The processor 102 may interact with an orientation sensor 136 such as an accelerometer that may be utilized to detect direction of gravitational forces or gravity-induced reaction forces. The processor 102 may interact with camera module 140 which may include one or more forward and/or rear facing cameras for photography, video conferencing or for optical recognition of gestures and objects such, as a stylus, for user interface operations.

To identify a subscriber for network access, the portable electronic device 100 uses a Subscriber Identity Module or a Removable User Identity Module (SIM/RUIM) card 138 for communication with a network, such as the wireless network 150. Alternatively, user identification information may be programmed into memory 110.

The portable electronic device 100 includes an operating system 146 including instructions for implementing at least portions of the user interface module 147, and software components or programs 148 that are executed by the processor 102 and are typically stored in a persistent, updatable store such as the memory 110. Memory 110 receives content from a computer readable medium comprising computer instructions executable on at least one processing unit. Additional applications or programs may be loaded onto the portable electronic device 100 through the wireless network 150, the auxiliary I/O subsystem 124, the data port 126, the short-range communications subsystem 132, or any other suitable subsystem 134.

A received signal such as a text message, an e-mail message, or web page download is processed by the communication subsystem 104 and input to the processor 102. The processor 102 processes the received signal for output to the display 114 and/or to the auxiliary I/O subsystem 124. A subscriber may generate data items, for example e-mail messages, which may be transmitted over the wireless network 150 through the communication subsystem 104. For voice communications, the overall operation of the portable electronic device 100 is similar. The speaker 128 outputs audible information converted from electrical signals, and the microphone 130 converts audible information into electrical signals for processing.

The touch-sensitive display 118 may be any suitable touch-sensitive display, such as a capacitive, resistive, infrared, surface acoustic wave (SAW) touch-sensitive display, strain gauge, optical imaging, dispersive signal technology, acoustic pulse recognition, and so forth, as known in the art. A capacitive touch-sensitive display may include a capacitive touch-sensitive overlay within stylus sensor 112. The stylus sensor 112 may be an assembly of multiple layers in a stack including, for example, a substrate, a ground shield layer, a barrier layer, one or more capacitive touch sensor layers separated by a substrate or other barrier, and a cover. The capacitive touch sensor layers may be any suitable material, such as patterned indium tin oxide (ITO).

In one implementation, stylus sensor 112 employs touch-sensitive display 118 having a planar upper surface for supporting work sheets, e.g., rendered objects including drawings, charts, maps or the like. The touch-sensitive display 118 also has a generally planar grid of conductors underneath the work surface.

The conductor grid is composed typically of a plurality of straight, parallel, usually equi-spaced conductors extending in a horizontal or x-direction, and a plurality of straight, parallel, usually equi-spaced conductors extending in a vertical or y-direction. The stylus typically has an elongated, cylindrical body terminating in a conical tip. Near the tip, the stylus contains an antenna or an electrical coil disposed concentrically with the central axis of the stylus body.

Determination of stylus location and angle of tilt is known to those familiar with the art. In one implementation, the stylus 200 wirelessly transmits electrical signals received by the grid conductors, using the RF module for transmitting signals from the stylus to the stylus sensor. Then, the grid conductors are scanned by detection circuitry to yield a series of voltage waveforms of various amplitudes corresponding to the location of the conductors with respect to the stylus. The voltage waveforms obtained from the conductors are analyzed to obtain a calculation of the position of the stylus tip on the upper surface of touch-sensitive display 118. The stylus tilt of the stylus 200 may also be determined with further waveform analysis. The voltage waveform typically has a pair of spaced characteristic peaks whose magnitudes correspond to pen tilt. In one implementation, the stylus tilt of the stylus can be determined by analyzing either the peaks or the magnitudes of the waveform at "points" (i.e., voltages corresponding to specific conductors, or, simply stated, conductor voltages) at fixed distances on either side of the apparent pen position, and inside the waveform peaks. The antenna or coil at the tip of the stylus may further have an asymmetrical wireless radiation pattern to help facilitate determination of the stylus tilt.

Furthermore, the stylus 200 may also sense the stylus contact pressure exerted by the user of the stylus when using the stylus to contact the touch-sensitive display and then transmit a stylus pressure signal included within its transmitted signals. The stylus may also have at least one button activated by a button press by the user and the status of the button may also be included within the transmitted signals.

One or more touches, also known as touch contacts or touch events, may be detected by the touch-sensitive display 118. The processor 102 may determine attributes of the touch, including a location of a touch. Touch location data may include an area of contact or a single point of contact, such as a point at or near a center of the area of contact. The location of a detected touch may include x and y components, e.g., horizontal and vertical components, respectively, with respect to one's view of the touch-sensitive display 118. For example, the x location component may be determined by a signal generated from one touch sensor, and the y location component may be determined by a signal generated from another touch sensor. A signal is provided to the controller 116 in response to detection of a touch. A touch may be detected from any suitable object, such as a stylus, finger, thumb, appendage, or other items, depending on the nature of the touch-sensitive display 118. Multiple simultaneous touches may be detected.

The touch-sensitive display 118 is also configured to detect a gesture. A gesture, such as a swipe, is a type of touch that begins at an origin point and continues to a finishing point while touch contact is maintained. A swipe may be long or short in distance, or duration, or both distance and duration. Two points of the swipe may be utilized to determine a vector that describes a direction of the swipe. The duration of the swipe may be determined from the origin point and finishing point of the swipe in time. The processor 102 receives data from the controller 116 to determine the direction, magnitude, and duration of the swipe. The gesture may be tracked and a plurality of sub-vectors determined for each gesture. The final sub-vector may be utilized to determine a distance and duration of a final portion of the gesture. The processor 102 receives data from the controller 116 to determine the speed of the swipe based on the distance and duration of the final portion of the gesture.

Actuators 120 may be disposed beneath the touch-sensitive display 118 and may be depressed or activated by applying force to overcome the actuation force of the actuator 120. The actuators 120 may provide input to the processor 102 when actuated. Actuation of the actuator(s) 120 may result in provision of tactile feedback. Force sensors 122 may work in combination with the actuators to measure an applied force. Force generally refers to force measurements, estimates, and/or calculations, such as pressure, deformation, stress, strain, force density, force-area relationships, thrust, torque, and other effects that include force or related quantities.

Those familiar with the art will appreciate that there are numerous ways to determine stylus location, tilt and pressure that realize the function of stylus sensor system 121. For example, stylus location and tilt can be determined by optical triangulation with a pair of cameras monitoring one or more fiducials of the stylus, or sonic, ultrasonic audio or radio frequency triangulation using time-of-flight signaling and triangulation. These approaches can be performed with active or passive stylus. Stylus pressure can be sensed in a number of ways including the use of force sensor 122. The stylus tilt of the stylus may also be determined by an accelerometer or gyro included within the stylus. Further, the tilt of the touch-sensitive display can be determined with an accelerometer or gyro associated with the touch screen display. The stylus tilt of the stylus relative to the touch-sensitive display can be calculated by comparing the stylus and touch-sensitive display tilt angles.

FIG. 1 shows an apparatus or portable electronic device 100 for modifying an appearance of an object rendered on the apparatus comprising: a display 114 for rendering a plurality of objects; a stylus sensor system 121 including a stylus 200 and a stylus sensor 112 for determining a contact location of the stylus upon the display; a user interface module 147 for rendering each of the plurality of objects in a corresponding plurality of rendered locations on the display and for determining a location of a selected object of the plurality of objects, the selected object have a rendered location correspond to the contact location of the stylus upon the display; the stylus sensor system further for determining a stylus tilt of the stylus relative to the display; and the user interface module further for modifying an at least one appearance characteristic of the selected object in response to the stylus tilt.

Furthermore, the apparatus of FIG. 1 may be a multiple component portable device with all elements of FIG. 1, but for stylus 200, assembled into a first component and the stylus 200 assembled into a second component detachably removable from the first component.

Figure 2:
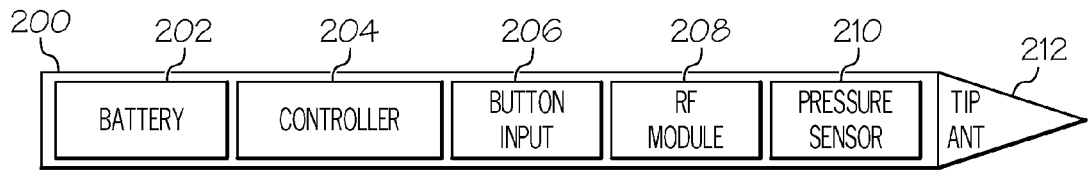
FIG. 2 shows a block diagram of a stylus.

FIG. 2 shows a block diagram of a stylus. The stylus 200 has a battery 202 for powering the operation of the stylus. In another alternative, the stylus may be powered by inductive coupling included in the stylus sensor system 121 in place of or as a complement to the battery. Controller 204 monitors the button input 206, which may include one or more buttons operable by a user, and the pressure sensor 210 to control the operation of the RF module 208. When a slight pressure on the tip 212 of the stylus is detected, the controller powers on the RF module which transmits RF signals trough an antenna at least partially included at tip 212. The RF signals allow for determination of stylus contact location on the touch-sensitive display 118 as well as a stylus tilt of the stylus relative to the touch-sensitive display. Within the RF signals, the controller can include additional signals for processing by user interface module 147 including a signal indicative of contact pressure sensed by pressure sensor 210, the status of the button input 206 as well as a charge status of battery 202.

Figure 3:
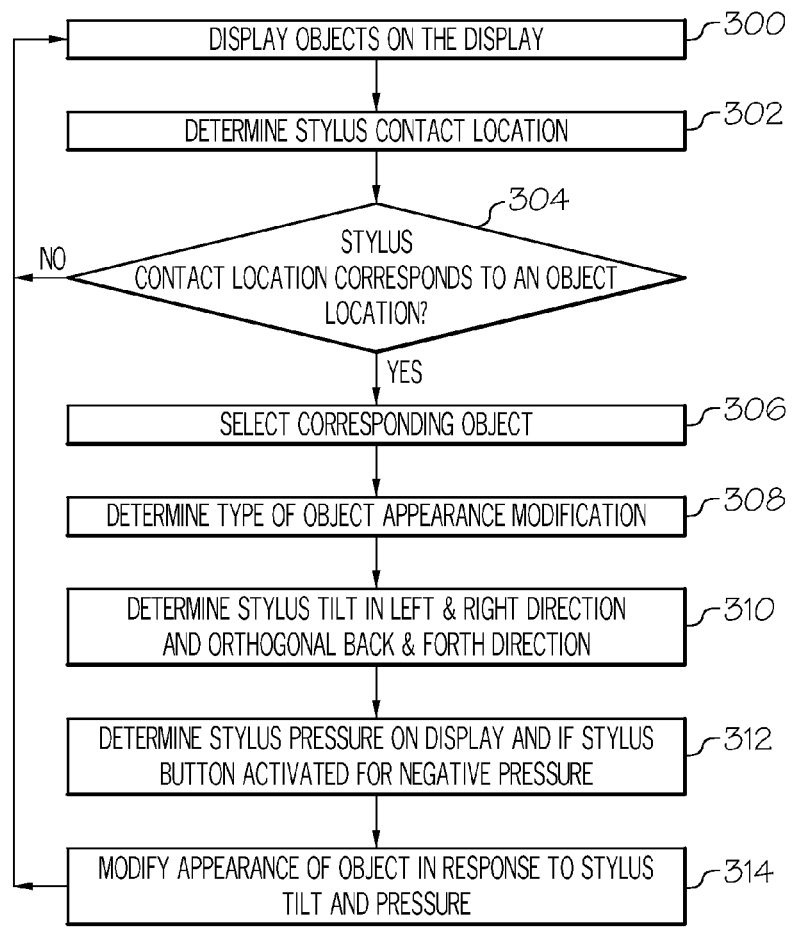
FIG. 3 shows a flow diagram of a method for modifying an object rendered on a touch-sensitive display in response to a stylus.

FIG. 3 shows a flow diagram of a method for modifying an object rendered on a touch-sensitive display in response to a stylus. In step 300 objects are rendered on the display. Objects are rendered by the user interface module 147 operating either with processes of the operating system 146 or other programs 148.

Figure 4:
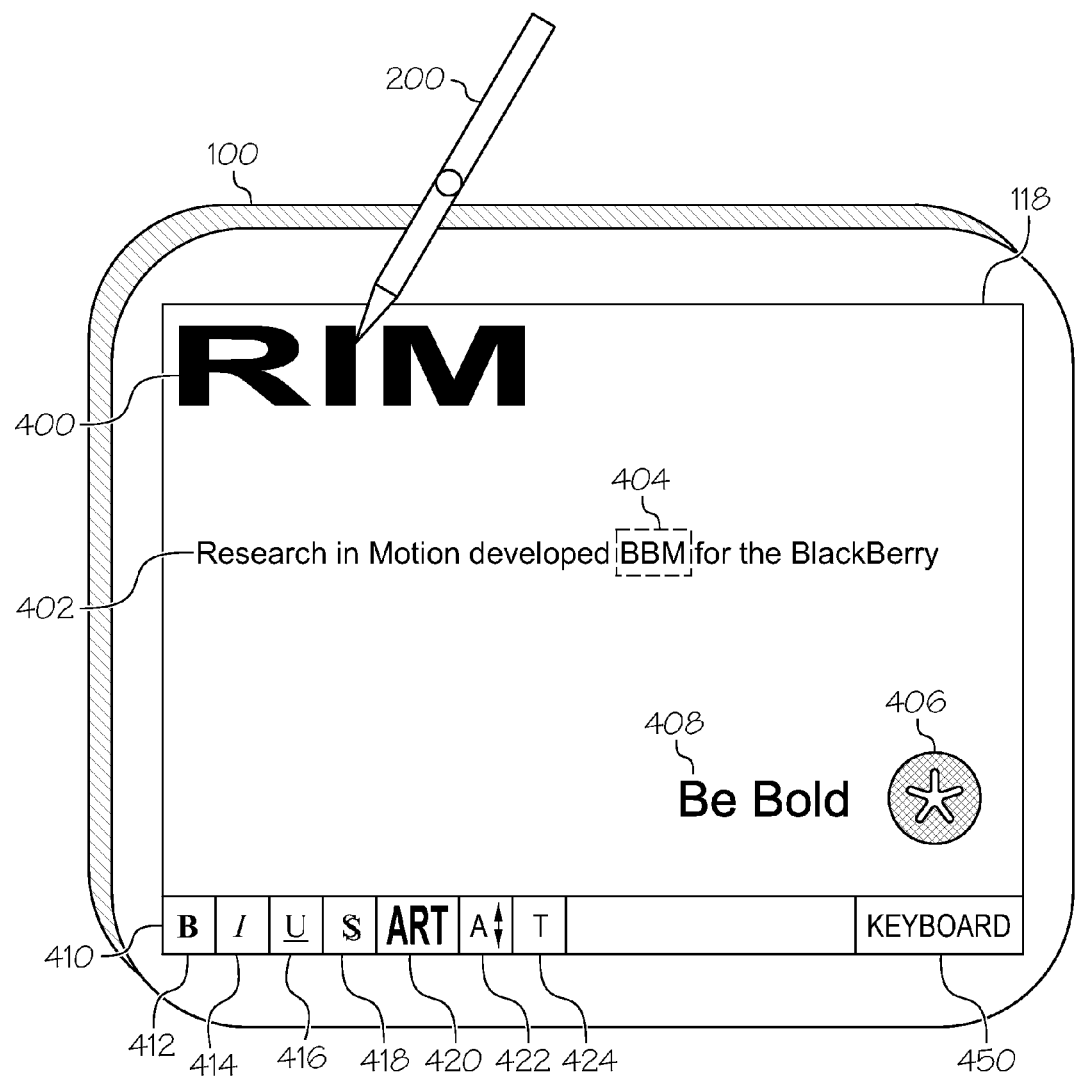
FIG. 4 shows an example of the displaying of objects at various locations for modification with a stylus.

FIG. 4 shows an example of the displaying of objects at various locations for modification with a stylus. Portable electronic device 100 displays objects on touch-sensitive display 118. Object 400 includes the letters "RIM" located in the upper left portion of touch-sensitive display 118. Object 402 includes the text "Research in Motion developed BBM for the BlackBerry." Object 404 includes the letters "BBM" and is located within the Object 402. Object 406 is a circular icon. Object 408 is the text "Be Bold". In this example, the objects of FIG. 4 are rendered at step 300 of FIG. 3. The objects of FIG. 4 may be created on portable electronic device 100 by any of a number of installed program applications for creating content including word processing, drawing, presentation creation applications including applications bundled in a Microsoft Office application suite. Also, the objects may be stored on the electronic device or received over the network.

Next step 302 of FIG. 3 determines the stylus contact location on the touch-sensitive display. FIG. 4 shows that stylus 200 has a contact location corresponding to the upper left portion of touch-sensitive display 118. Step 304 determines if the stylus contact location corresponds to an object location. If not, the stylus is not being used for object modification and step 300 is returned to. In the case of stylus modification, FIG. 4 shows both the stylus contact location and location of object 400 to be in correspondence, they are both in the upper left portion of the touch-sensitive display 118. Thus the stylus 200 is making contact at a location corresponding to the location of the display of object 400, the letters "RIM" and step 306 selects the corresponding object 400 for modification.

If the electronic device of FIG. 4 was executing a presentation application program, such as Microsoft PowerPoint, then the examples of FIG. 4-FIG. 7 show one implementation of object modification. Tool bar 410 shows a representative example of a tool bar. An actual toolbar could have significantly more or different icons and corresponding tools. Object 400 could have been created by selecting the "ART" tool 420 for the creation of "word art" and then selecting a location in the upper left area of the touch-sensitive display, selecting keyboard icon 450 and entering the three letters A-R-T on a resulting pop-up keyboard rendered on touch-sensitive display 118. In another implementation there may be a physical keyboard. Object 402 and object 408 can be created in a similar way but with selection of the text generation "T" tool 424 for entering text instead of the "ART" tool 240. Object 406 could be copied from clip art or another application such as a web browser and pasted into its current location. Other tools in toolbar for modifying objects include the character weight "B" tool 412, the object slope "I" tool 414, the character underline "U" tool 416, the object shadow "S" tool 418 and the object size "A" tool 422. Step 308 determines the type of object appearance modification is to be performed on the selected object. In this example this is done by determining which of the icons of toolbar 410 are selected.

Then, step 310 of FIG. 3 determines the stylus tilt. Stylus tilt can be determined to have components in either or both of two orthogonal directions. In this example a first orthogonal direction has a left and right orientation and the second orthogonal direction has a backward and forward orientation. Other embodiments can choose to use other directions in other orientations for object modification. Then step 312 determines stylus pressure and if a stylus button is activated. It will be appreciated that both stylus tilt and pressure are variable and that the press of a button on the stylus can be used to supplement the pressure variable to simulate a negative pressure. Then step 314 modifies the appearance of the selected object in response to stylus tilt and/or pressure.

Figure 5:
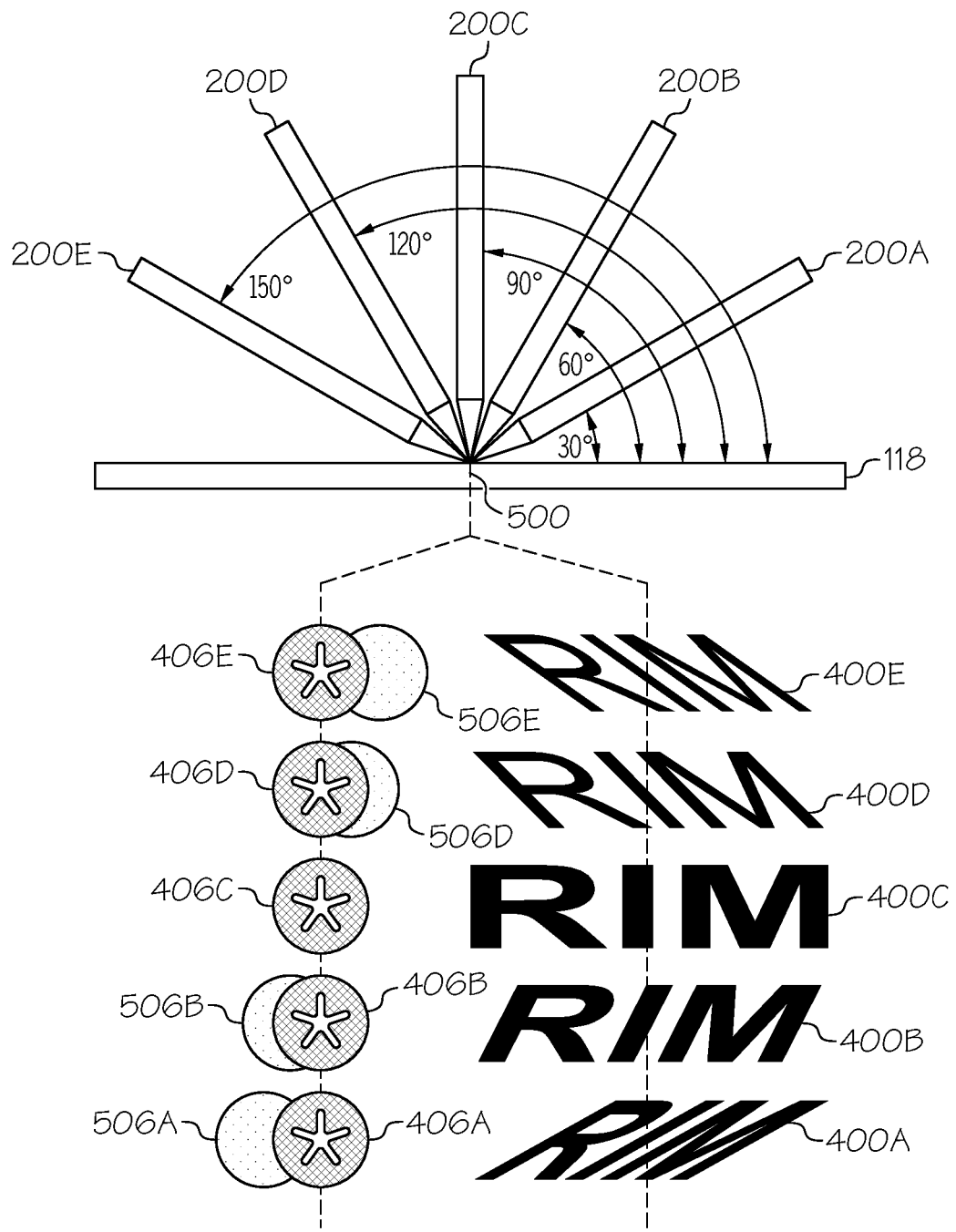
FIG. 5 shows two examples of object modification in response to stylus tilt.

FIG. 5 shows two examples of object modification in response to stylus tilt. The stylus makes contact with the touch-sensitive display 118 at location 500. The stylus is shown with five different stylus tilt angles. Stylus 200A shows a 30 degree stylus tilt angle. Stylus 200B shows a 60 degree stylus tilt angle. Stylus 200C shows a 90 degree stylus tilt angle. Stylus 200D shows a 120 degree stylus tilt angle. Stylus 200E shows a 150 degree stylus tilt angle.

If stylus location 500 of FIG. 5 corresponds to the rendered location of object 400 of FIG. 4, and if the object slope "I" tool 414 is selected, then the appearance of object 400 is modified as shown where the object slope is modified in response to stylus tilt. When the stylus 200C is perpendicular to the touch-sensitive display 118 object 400C has no slope appearance, the characters appear perpendicular. As the stylus tilt is increased to the left at stylus 200D and then stylus 200E, the slope of the object correspondingly increases to the left at object 400D and then object 400E. As the stylus tilt is increased to right at stylus 200B and then stylus 200A, the slope of the object correspondingly increases to the right at object 400B and then object 400A.

If stylus location 500 of FIG. 5 corresponds to the rendered location of object 406 of FIG. 4, and if tool 418 is selected, then the appearance of object 406 is modified as shown where the location of a shadow background image relative to a foreground image is modified in response to stylus tilt. With the shadow tool, the object becomes a foreground image 406A-406E and the appearance of the object is modified with the addition of a background image 506A-506E that appears as a shadow of the foreground image where the location of background image is modified in response to the stylus tilt of the stylus. When the stylus 200C is perpendicular to the touch-sensitive display 118, the appearance of object is shown as object 406C with only a foreground image and no shadow image because the shadow image would appear obstructed by the foreground image. As the stylus tilt is increased to the left at stylus 200D and then stylus 200E, the location of the background image correspondingly increases to the right at background image 506D and then background image 506E relative to respective foreground image 406D and foreground image 406E. As the stylus tilt is increased to right at stylus 200B and then stylus 200A, the background image location correspondingly increases to the left at background image 506B and then background image 506A relative to respective foreground image 406B and foreground image 406A.

Figure 6:
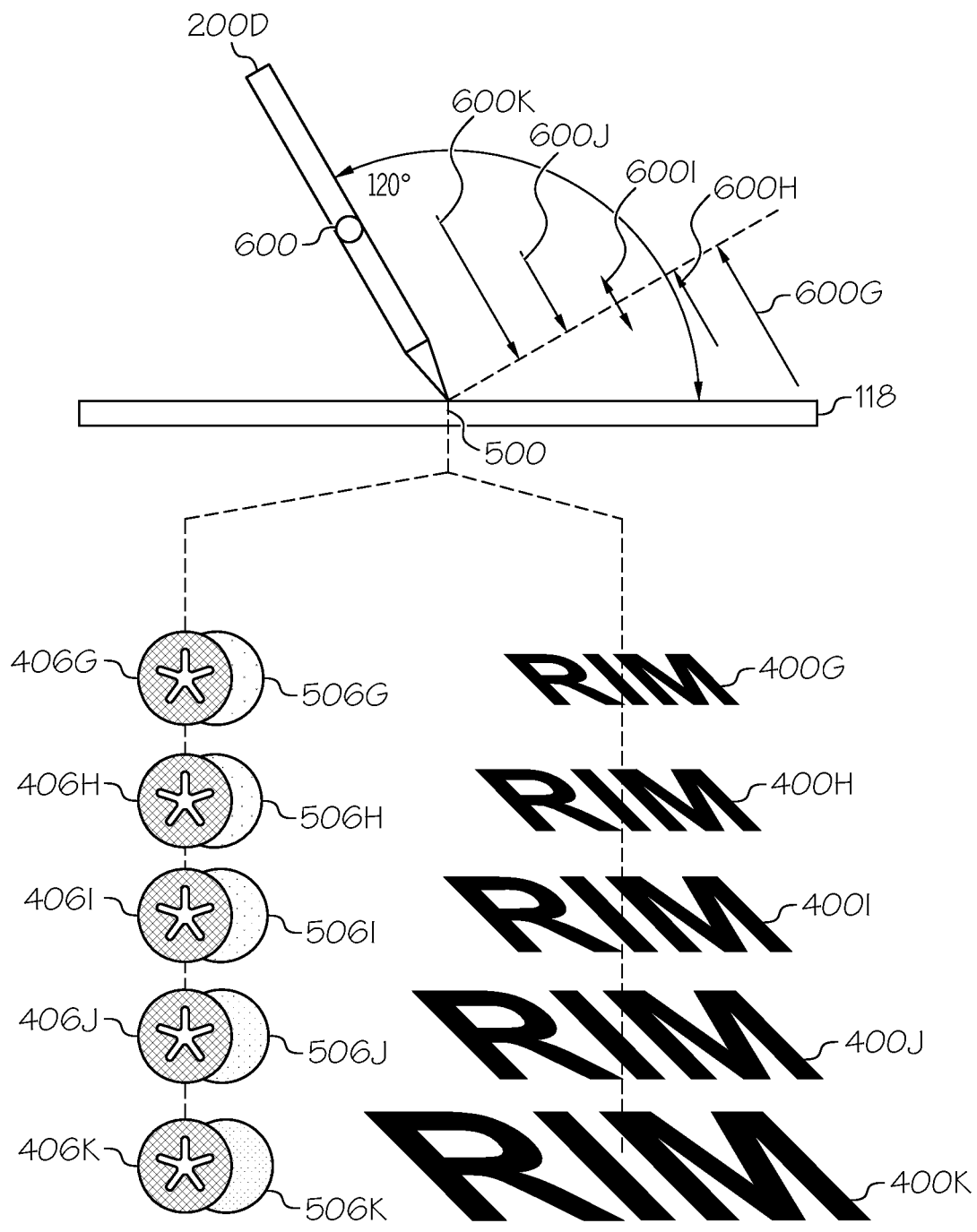
FIG. 6 shows two examples of object modification in response to stylus pressure.

FIG. 6 shows two examples of object modification in response to stylus pressure. Stylus 200D is shown contacting touch-sensitive display 118 at location 500 at a 120 degree tilt. Button 600 on the stylus is used to indicate a negative stylus pressure. Vector 600K has a magnitude that indicates a large stylus contact pressure is being exerted by the user asserting a large force against location 500 with stylus 200D. Vector 600G has a similar magnitude to vector 600K but in an opposite direction indicating a similar stylus contact pressure being asserted at vector 600K but button 600 is pressed to indicate a negative stylus contact pressure. Vector 600J has a lesser positive magnitude than vector 600K and vector 600H has a lesser negative magnitude than vector 600G. The positive magnitudes of vectors 600J and 600K indicate that button 600 is not being pressed during the assertion of stylus contact pressure and the negative magnitudes of vectors 600H and 600G indicate that button 600 is being pressed during the assertion of stylus contact pressure. Vector 600I indicates a small magnitude of either positive or negative pressure being asserted by the stylus 200D.

If stylus location 500 of FIG. 6 corresponds to the rendered location of object 400 of FIG. 4, and if object size "A" tool 422 is selected, then the appearance of object 400 is modified as shown, where the object size is modified in response to stylus contact pressure. When the stylus contact pressure magnitude is small on the touch-sensitive display 118, as shown by vector 600I, the appearance of object is shown at object 400I as having a size corresponding to object 400D of FIG. 5. As the stylus contact pressure is increased in a positive magnitude at vector 600J and then vector 600K, the size of the object correspondingly increases at object 400J and then object 400K. As the stylus contact pressure is increased in a negative magnitude at vector 600H and then vector 600G, the size of the object correspondingly decreases at object 400H and then object 400G.

If stylus location 500 of FIG. 6 corresponds to the rendered location of object 406 of FIG. 4, and object shadow "S" tool 418 is selected, the stylus 200D has a 120 degree tilt and the stylus contact pressure is varied, then the appearance of object 406 is modified as shown where the darkness of the background image is modified in response to stylus contact pressure. When the stylus contact pressure magnitude is small on the touch-sensitive display 118, as shown by vector 600I, the appearance of object 406 has a foreground image 406I and a background image 506I. The foreground image 406I remains unchanged from foreground image 406D and the darkness of background image 506I remains unchanged from background image 506D. As the stylus contact pressure is increased in a positive magnitude at vector 600J and then vector 600K, the darkness of the background image correspondingly increases at background image 506J and then background image 506K, while foreground image 406J and foreground image 406K remain unchanged. As the stylus contact pressure is increased in a negative magnitude at vector 600H and then vector 600G, the darkness of the background image correspondingly decreases at background image 506H and then background 506G, while foreground image 406H and foreground image 406G remain unchanged.

Figure 7:
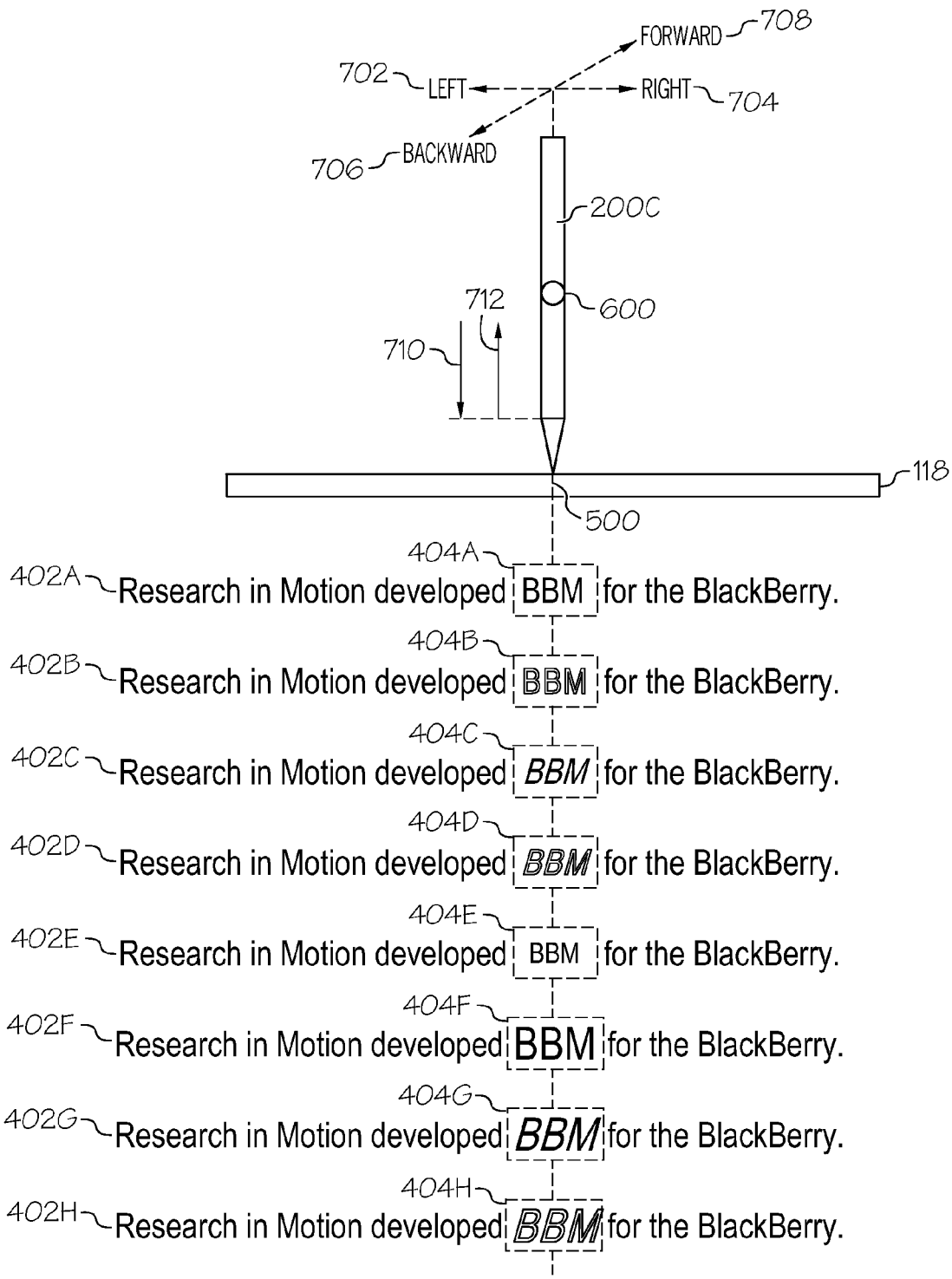
FIG. 7 shows multiple examples of object modification in response to stylus tilt and stylus pressure.

FIG. 7 shows multiple examples of object modification in response to stylus tilt and stylus pressure. Stylus 200C is perpendicular to touch-sensitive display 118 and is making contact at location 500. The stylus may have a left tilt 702, a stylus right tilt 704, a stylus backward tilt 706 and a stylus forward tilt 708. The stylus may also assert a positive stylus contact pressure 710 when button 600 is not pressed and a negative stylus contact pressure 712 when button 600 is pressed.

If stylus location 500 of FIG. 7 corresponds to the rendered location of object 404 occurring within object 402 of FIG. 4 and no stylus tilt or significant pressure were present, then the appearance would be as shown at object 402A and object 404A, the letter "BBM" appearing unmodified from object 402 and object 404 of FIG. 4.

If the character weight "B" tool 412 was selected and a positive stylus contact pressure 710 asserted on object 404A then the appearance would be as shown at object 402B and object 404B with object 404B having a greater character weight, or the appearance of a "bold" font characteristic for the letters "BBM".

If the character weight "B" tool 412 was selected and a negative stylus contact pressure 712 asserted on object 404B then the appearance would be as shown at object 402A and object 404A with object 404A having a reduced character weight from the appearance of a "bold" font characteristic of object 404B.

If the object slope "I" tool 414 was selected and a stylus right tilt 704 asserted on object 404A then the appearance would be as shown at object 402C and object 404C with object 404C having a greater right slope, or the appearance of an "italics" font characteristic for the letter "BBM".

If the both the character weight "B" tool 412 and the object slope "I" tool 414 were selected and both a positive stylus contact pressure 710 and a stylus right tilt 704 were simultaneously asserted on object 404A then the appearance would be as shown at object 402D and object 404D with object 404D having a greater character weight and a right slope, or the appearance of a "bold" and an "italics" font characteristic on the letters "BBM". Thus, two object appearance characteristics are modified with a single stylus action.

If the object size "A" tool 422 was selected and a stylus backward tilt 706 asserted on object 404A then the appearance would be as shown at object 402E and object 404E with object 404E having a reduced size font characteristic on the letters "BBM".

If the object size "A" tool 422 was selected and a stylus forward tilt 708 asserted on object 404A then the appearance would be as shown at object 402F and object 404F with object 404F having an increased size font characteristic on the letters "BBM".

If both the object size "A" tool 422 and the object slope "I" tool 414 were selected and both a stylus forward tilt 708 and a stylus right tilt 704 were simultaneously asserted on object 404A then the appearance would be as shown at object 402G and object 404G with object 404G having an increased size and a right slope font characteristic on the letters "BBM". Thus, two object appearance characteristics are modified with a single stylus action. This shows that object appearance includes first appearance characteristic, object size, and a second appearance characteristic, object slope. A first stylus tilt is determined in a first direction, the forward direction, and a second stylus tilt is determined in a second direction orthogonal to the first direction, the right direction. The first appearance characteristic is modified in response to the first stylus tilt and the second appearance characteristic is modified in response to the second stylus tilt.

If the object size "A" tool 422, the object slope "I" tool 414 and the character weight "B" tool 412 were selected and a stylus forward tilt 708, a stylus right tilt 704 and a positive stylus contact pressure 712 were simultaneously asserted on object 404A then the appearance would be as shown at object 402H and object 404H with object 404H having an increased size, a right slope and a greater weight font characteristic on the letters "BBM". In this example, three object appearance characteristics are modified with a single stylus action.

Thus, the appearance of an object may be modified in response to stylus tilt and stylus pressure. It will be appreciated that while a few examples of object modification have been shown using stylus tilt and stylus pressure, numerous other types of object appearance modification (not shown) are anticipated with this convenient and efficient approach. It will further be appreciated that the magnitude of the modification to the object appearance may be varied in response to the magnitude of the stylus tilt and the magnitude of the stylus pressure.

The terms "a" or "an", as used herein, are defined as one as or more than one. The term "plurality", as used herein, is defined as two as or more than two. The term "another", as used herein, is defined as at least a second or more. The terms "including" and "having," as used herein, are defined as comprising (i.e., open language). The term "coupled," as used herein, is defined as "connected," although not necessarily directly, and not necessarily mechanically. "Communicatively coupled" refers to coupling of components such that these components are able to communicate with one another through, for example, wired, wireless or other communications media. The term "communicatively coupled" or "communicatively coupling" includes, but is not limited to, communicating electronic control signals by which one element may direct or control another. The term "configured to" describes hardware, software or a combination of hardware and software that is adapted to, set up, arranged, commanded, altered, modified, built, composed, constructed, designed, or that has any combination of these characteristics to carry out a given function. The term "adapted to" describes hardware, software or a combination of hardware and software that is capable of, able to accommodate, to make, or that is suitable to carry out a given function.

The terms "controller", "computer", "server", "client", "computer system", "computing system", "personal computing system", or "processing system" describe examples of a suitably configured processing system adapted to implement one or more embodiments of the present disclosure. Any suitably configured processing system is similarly able to be used by embodiments of the present disclosure, for example and not for limitation, a personal computer, a laptop computer, a tablet computer, a personal digital assistant, a workstation, or the like. A processing system may include one or more processing systems or processors. A processing system can be realized in a centralized fashion in one processing system or in a distributed fashion where different elements are spread across several interconnected processing systems.

The terms "computing system", "computer system", and "personal computing system", describe a processing system that includes a user interface and which is suitably configured and adapted to implement one or more embodiments of the present disclosure. The terms "network", "computer network", "computing network", and "communication network", describe examples of a collection of computers and devices interconnected by communications channels that facilitate communications among users and allows users to share resources.

The term "electronic device" is intended to broadly cover many different types of electronic devices used by persons, and that include a user interface that can interoperate with a user. For example, and not for any limitation, an electronic device can include any one or a combination of the following: a two-way radio, a cellular telephone, a mobile phone, a smartphone, a two-way pager, a wireless messaging device, a personal computer, a laptop personal computer, a tablet computer, a gaming unit, a personal digital assistant, and other similar electronic devices.

Although specific embodiments of the subject matter have been disclosed, those having ordinary skill in the art will understand that changes can be made to the specific embodiments without departing from the spirit and scope of the disclosed subject matter. The scope of the disclosure is not to be restricted, therefore, to the specific embodiments, and it is intended that the appended claims cover any and all such applications, modifications, and embodiments within the scope of the present disclosure.

What is claimed is:

1. A method for modifying an object rendered on a touch-sensitive display in response to a stylus input comprising:
    determining a contact location of the stylus upon the touch-sensitive display;
    determining a location of a selected object of a plurality of objects rendered on the touch-sensitive display to correspond to the contact location, wherein the location of the selected object is independent of a stylus tilt relative to the display and a stylus contact pressure;
    determining the stylus tilt relative to the touch-sensitive display; and
    modifying an at least one appearance characteristic of the selected object in response to the stylus tilt while maintaining the location of the selected object.

2. The method according to claim 1 wherein the selected object includes a text string and the at least one appearance characteristic includes at least one font characteristic and the modifying includes modifying the at least one font characteristic in response to the stylus tilt.

3. The method according to claim 2 where the at least one font characteristic includes slope, size and weight.

4. The method according to claim 1 wherein the at least one appearance characteristic includes a first appearance characteristic and a second appearance characteristic, and the determining the stylus tilt determines a first stylus tilt in a first direction and a second stylus tilt in a second direction orthogonal to the first direction, and the modifying includes modifying the first appearance characteristic in response to the first stylus tilt and modifying the second appearance characteristic in response to the second stylus tilt.

5. The method according to claim 4 wherein the first appearance characteristic includes object size and the second appearance characteristic includes object slope and the modifying includes modifying the object size in response to the first stylus tilt and modifying the object slope in response to the second stylus tilt.

6. The method according to claim 1 wherein the at least one appearance characteristic includes a foreground image and a background image, the background image having a background image location relative to the foreground image and the modifying modifies the background image location of the background image relative to the foreground image in response to the stylus tilt.

7. The method according to claim 6 wherein
    the determining the contact location of the stylus upon the touch-sensitive display includes determining the stylus contact pressure,
    the modifying further modifies the at least one appearance characteristic of the object in response to the contact pressure, and
    the background image has a darkness that is varied in response to the contact pressure, and the foreground image is not modified in response to the contact pressure.

8. The method according to claim 1 wherein
    the determining the contact location of the stylus upon the touch-sensitive display includes determining the stylus contact pressure, and
    the modifying further modifies the at least one appearance characteristic of the object in response to the contact pressure.

9. The method according to claim 8 wherein the selected object includes a text string having a first font characteristic and another font characteristic, and the modifying includes modifying the first font characteristic in response to the stylus tilt and modifying the other font characteristic in response to the contact pressure.

10. The method according to claim 9 wherein the determining the stylus tilt determines a first stylus tilt in a first direction and a second stylus tilt in a second direction orthogonal to the first direction, the text string further includes a second font characteristic, and the modifying modifies the first font characteristic in response to the first stylus tilt, the second font characteristic in response to the second stylus tilt and the other font characteristic in response to the contact pressure.

11. The method according to claim 10 wherein the first font characteristic includes size, the second font characteristic includes slope, and the other font characteristic includes weight.

12. The method according to claim 1 wherein a processor system coupled to a memory including a computer readable medium that when executed cause the processor system to implement the method of claim 1.

13. A method for modifying an object rendered on a touch-sensitive display in response to a stylus input comprising:
    determining a contact location of the stylus upon the touch-sensitive display;
    determining a location of a selected object of a plurality of objects rendered on the touch-sensitive display to correspond to the contact location;
    determining a stylus contact pressure of the stylus making contact with the touch-sensitive display; and
    modifying an at least one appearance characteristic of the selected object in response to the stylus contact pressure, wherein the at least one appearance characteristic includes a foreground image and a background image, and
    the background image has a darkness that is varied in response to the contact pressure, and the foreground image is not modified in response to the contact pressure.

14. An apparatus for modifying an appearance of an object rendered on the apparatus comprising:
    a display for rendering a plurality of objects appearing in two dimensions;
    a stylus sensor for determining a contact location of a stylus upon the display;
    a user interface module for rendering each of the plurality of objects in a corresponding plurality of locations on the display and for determining a location of a selected object of the plurality of objects, the location of the selected object corresponding to the contact location and independent upon a stylus tilt relative to the display;

the stylus sensor further for determining the stylus tilt of the stylus relative to the display; and the user interface module further for modifying an at least one appearance characteristic of the selected object in response to the stylus tilt while maintaining the location of the selected object.

15. The apparatus according to claim 14 wherein the at least one appearance characteristic includes a first appearance characteristic and a second appearance characteristic, the stylus sensor determines a first stylus tilt in a first direction and a second stylus tilt in a second direction orthogonal to the first direction, and the user interface module modifies the first appearance characteristic in response to the first stylus tilt and the second appearance characteristic in response to the second stylus tilt.

16. The apparatus according to claim 14 wherein the stylus sensor determines a stylus contact pressure, and the at least one appearance characteristic includes a first appearance characteristic and another appearance characteristic, and the user interface module modifies the first appearance characteristic in response to the stylus tilt and the other appearance characteristic in response to the stylus contact pressure.

17. The apparatus according to claim 14 wherein the apparatus is a multiple component portable device including a first component having a processor, memory and programs for operating processes of the apparatus including at least portions of the user interface module,
a communication subsystem for communicating with a network,
the display, and
the stylus sensor for receiving signals from the stylus, and further including a second component detachably removable from the first component, the second component including the stylus, the stylus including
at least one button for interfacing with the user interface module,
a controller for controlling operation of the stylus, and
an RF module for transmitting signals from the stylus to the stylus sensor.

18. The apparatus of claim 14 wherein the apparatus comprises at least one of: a Personal Information Manager (PIM), Personal Digital Assistant (PDA), a pager, a mobile phone, a cellular phone, a smart-phone, a super-phone, a tablet computer, a laptop, and a Personal Computer (PC).

19. The apparatus according to claim 14 wherein the selected object includes a text string and the at least one appearance characteristic includes an at least one font characteristic and the user interface module modifies the at least one font characteristic in response to the stylus tilt.

20. The apparatus according to claim 14 wherein the object includes a foreground image and a background image and the user interface module modifies the background image relative to the foreground image in response to the stylus tilt.

* * * * *